(12) United States Patent
Vignotto et al.

(10) Patent No.: US 6,241,395 B1
(45) Date of Patent: Jun. 5, 2001

(54) ENCODER WHEEL FOR A ROLLER BEARING

(75) Inventors: Angelo Vignotto, Turin; Massimo Marivo, Airasca, both of (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 09/447,754

(22) Filed: Nov. 23, 1999

(30) Foreign Application Priority Data

Dec. 24, 1998 (IT) .............................. TO98A1086

(51) Int. Cl.$^7$ .............................. F16C 32/00; G01P 3/487
(52) U.S. Cl. ...................... 384/448; 324/207.25
(58) Field of Search .................... 384/448, 477, 384/486; 324/173, 174, 207.2, 207.21, 207.25

(56) References Cited

U.S. PATENT DOCUMENTS 5,017,868 * 5/1991 Hajzler .................. 324/207.25 X
5,575,568 * 11/1996 Rigaux et al. .................. 384/448
5,969,518 * 10/1999 Merklein et al. ................ 324/173

FOREIGN PATENT DOCUMENTS 0 607 719 A1  7/1994 (EP) .

* cited by examiner

*Primary Examiner*—Thomas R. Hannon
(74) *Attorney, Agent, or Firm*—Merchant & Gould P.C.

(57) ABSTRACT

An encoder wheel (1) for a roller bearing provided with a multipolar magnetised ring (5) presenting an axial thickness (S) which is radially variable in an inversely proportional way to a radius (R) of the ring (5) itself, and also provided with a metallic insert (6) for supporting the multipolar ring (5) itself; the metallic insert (6) presenting a curved annular wall (11), which axially delimits the multipolar ring (5), and presents a variable curvature to the variation of the thickness (S) of the multipolar ring (5).

14 Claims, 1 Drawing Sheet

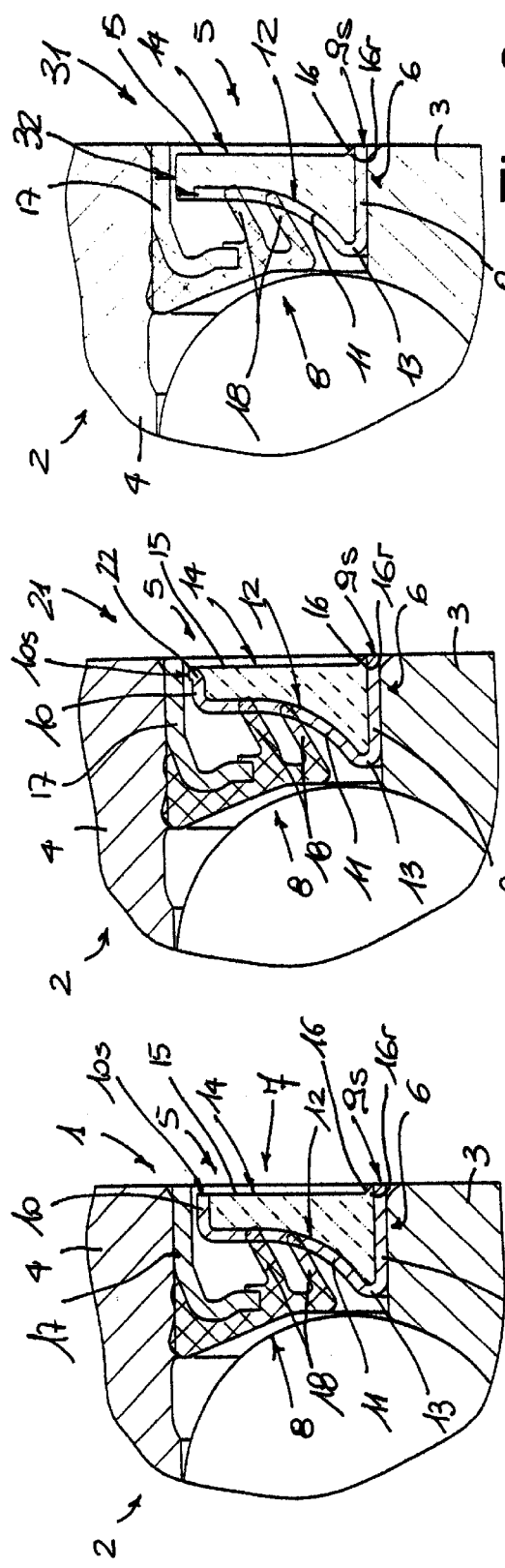
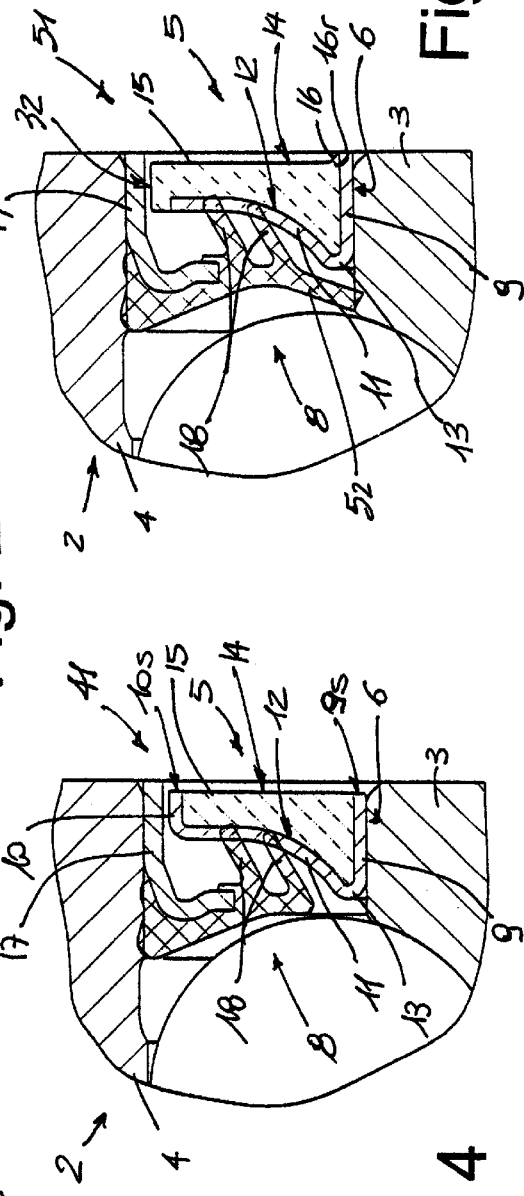
Fig. 1
Fig. 2
Fig. 3
Fig. 4
Fig. 5

ENCODER WHEEL FOR A ROLLER BEARING

The present invention relates to an encoder wheel for a roller bearing.

In general, encoder wheels for roller bearings of a currently well-known type comprise a magnetised multipolar ring and a metallic support insert which supports the multipolar ring itself and which is force-fitted onto an internal ring of the relevant roller bearing.

In encoder wheels of the type described above, the magnetised multipolar ring presents a constant axial thickness to the variation of its own radius and is made of a magnetisable elastomer material, such as plastoferrite, and is installed in a position facing a sensor which is angularly mounted integral to the stationary part of the bearing on the outside of the bearing itself.

The above-mentioned sensor is sensitive to variations in the magnetic field due to the rotation of the multipolar ring, and is extremely subject to eventual errors in assembly with regard to the ring itself, that it to say that the sensor has to be assembled in relation to the ring in an extremely precise radial position in order to avoid any deterioration in the quality of the measurements to be carried out. In encoder wheels of the type described above, therefore, it is usually necessary to carry our lengthy and expensive registration operations once the sensor and the multipolar ring have been assembled.

The aim of the present invention is to produce an encoder wheel for a roller bearing which will be easy to use and which will also be simple and easy to install independent of the conditions pertaining to assembly.

According to the present invention, an encoder wheel for a contact bearing will be produced, comprising magnetised multipolar ring and a metallic insert for supporting the multipolar ring itself; the encoder wheel being characterised by the fact that the multipolar ring presents an axial thickness which is radially variable according to a determined law of variation.

The present invention will now be described with reference to the attached drawings, which illustrate a non-limiting embodiment of the present invention, in which:

FIG. 1 is an axial section view of a first preferred form of embodiment of an encoder wheel for a roller bearing according to the present invention; and FIGS. 2, 3, 4 and 5 are axial section views of respective further forms of embodiment of the encoder wheel shown in FIG. 1.

With reference to FIGS. 1 and 2, the number 1 indicates in its entirety an encoder wheel for a bearing 2 which is partially illustrated and which comprises an internal ring 3 and an external ring 4, coaxially mounted in relation to each other, and a rotation axis (not shown) of the bearing 2 itself.

The encoder wheel 1 comprises a magnetised multipolar ring 5 made of plastoferrite; an annular metallic shield or insert 6 for supporting the ring 5 itself; and a sealing device 7 between the rings 3 and 4 comprising, as well as the shield 6, an annular sealing lip 8, which is maintained in sliding contact on the axially internal side of the shield 6, and is integrally mounted to the ring 4 of the bearing 2. The sealing device 7 is suitable for preventing the infiltration of external polluting agents into the internal parts of the bearing 2, and is also suitable for keeping lubricating grease inside the bearing 2 itself.

The shield 6 comprises two cylindrical elements 9 and 10 which are coaxial in relation to each other, the element 9 is force-fitted onto the ring 3 and presents an axial dimension greater than that of the element 10 and is axially limited towards the exterior of the bearing 2 by a respective annular surface 10s which is axially staggered towards the interior of the bearing 2 in relation to the surface 9s. The shield 6 also comprises an annular connecting element 11 between the elements 9 and 10, which has a substantially curved axial section orientated in such a way that its concave part is turned towards the interior of the bearing 2 and defines, together with the elements 9 and 10, a seat 12 for housing and shaping the ring 5.

Finally, the shield 6 comprises an annular connecting element 13 between the elements 9 and 11 which presents, in axial section, a rounded wedge shape such as to facilitate the assembly of the shield 6 itself onto the bearing 2.

The ring 5 is usually obtained by magnetising a decoding element in such a way as to present alternating polarities in a circumferential direction, and it is part of a measuring device for measuring the relative rotation speed between the rings 3 and 4 and the bearing 2. The ring 5 is arranged inside the seat 12 after being magnetised, and it faces a sensor (of a well-known type, but not illustrated), which is arranged outside the bearing 2 and which is angularly integral to the stationary parts of the bearing 2 itself and is also sensitive to variations in the magnetic field due to the rotation of the ring 5 itself.

The ring 5 is axially limited towards the interior of the bearing 2 by the element 11, and is axially limited towards the exterior of the bearing 2 by an external surface 14 which, from the part nearest the element 10, presents a greater surface portion 15 which is co-planar to the surface 10s, while from the part nearest the element 9, it presents a lesser surface connecting portion 16 between the portion 15 and the surface 9s. The axial staggering between the surfaces 9s and 10s and the portion 15 create, on the ring 5, an annular projection 16r which is laterally limited by the portion 16; the latter, together with the element 9, means that it is extremely simple to position the shield 6 onto the ring 3 of the bearing 2 without running any risk whatsoever of damaging the ring 5 itself.

The ring 5 presents an axial thickness S which varies according to a law of variation such that it is possible to maintain constant the magnetic characteristics of the ring 5 itself in the face of variations in a radius R. In particular, the thickness S is inversely proportional to the radius R and the ring 5 thus presents a thickness S which is greater than that of the element 9, that is to say greater than that of the internal ring 3 of the bearing 2, and it presents a thickness S which is less than that of the element 10, that is to say less than that of the external ring 4 of the bearing 2.

As has previously been described, the variations in the thickness S of the ring 5 means that the characteristics of the magnetic field of the ring 5 always remain the same independent of the radius R so that the above-mentioned sensor can be assembled facing at any point whatsoever on the surface 14 without resulting in any variations or errors in measurement.

The sealing 8 comprises an annular metallic insert 17, which is fixedly secured to the ring 4, and a pair of frusto-conical lips 18 which are supported by the insert 17 and are orientated in a substantially parallel fashion in relation to each other and are also arranged in sliding contact with the element 11 of the shield 6.

The form of embodiment illustrated in FIG. 2 relates to an encoder wheel 21 which is similar to the encoder wheel 1, from which the encoder wheel 21 differs due to the fact that the surface 9s of the element 9 is no longer an annular surface transverse to the above-mentioned axis, but is instead a cylindrical surface which faces towards the external ring 4 of the bearing 2. The element 10 of the encoder wheel 21, in fact, presents an end flap 22 which curves radially towards the exterior from the diameter of the element 10 itself and, together with the insert 17 of the sealing 8, it creates a labyrinth in such a way as to increase the overall sealing capacity of the sealing device 7.

The form of embodiment illustrated in FIG. 3 relates to an encoder wheel 31 which is similar to the encoder wheel 1, from which the encoder wheel 31 differs due to the fact that the shield 6 is not provided with the element 10, and the element 11 extends radially towards the exterior up to a diameter which is less that the diameter of a cylindrical external surface 32 of the ring 5. In this way, it is possible to obtain any kind of recess in the surface 32 in such a way as to directly create a sealing labyrinth between the ring 5 and the insert 17.

The form of embodiment illustrated in FIG. 4 relates to an encoder wheel 41 which is similar to the encoder wheel 1, from which the encoder wheel 41 differs due to the fact that the surfaces 9s and 10s are co-planar in relation to each other and to the portion 15 of the surface 14, which is not provided with the inclined portion 16.

The form of embodiment illustrated in FIG. 5 relates to an encoder wheel 51 which is similar to the encoder wheel 31 or, alternatively, to the encoder wheel 1, from both of which the encoder wheel 51 differs due to the fact that the sealing 8 comprises a further lip 52, which extends radially towards the interior of the most internal lip 18, and is arranged in sliding contact with the ring 4 of the bearing 2 with the aim of further improving the seal of the encoder wheel 51 itself.

What is claimed is:

1. Encoder wheel (1) (21)(31)(41)(51) for a roller bearing (2) comprising a multipolar magnetised ring (5) and a metallic insert (6) for supporting the multipolar ring (5) itself; the encoder wheel (1) (21) (31) (41) (51) being characterised by the fact that the multipolar ring (5) presents an axial thickness (S) which is radially variable according to a determined law of variation.

2. Encoder wheel according to claim 1, characterised by the fact that the axial thickness (S) of the multipolar ring (5) decreases in relation to the increase of a radius (R ) of the multipolar ring (5) itself.

3. Encoder wheel according to claim 2, characterised by the fact that the metallic insert (6) comprises an annular wall (11) which axially delimits the said multipolar ring (5), and presents a substantially curved axial section.

4. Encoder wheel according to claim 3, characterised by the fact that said annular wall (11) presents a curve, which is variable according to said law of variation.

5. Encoder wheel according to claims 4, characterised by the fact that the metallic insert (6) comprises at least one cylindrical wall (9) which defines with the said annular wall (11) a housing seat (12) for the said multipolar ring (5), and which presents a respective first external annular surface (9s) for positioning the encoder wheel itself.

6. Encoder wheel according to claim 5, characterised by the fact that the said metallic insert (6) comprises an annular connecting element (13) between said annular wall (11) and said cylindrical wall (9); the annular element (13) presenting, in axial section, a rounded wedge shape.

7. Encoder wheel according to claims 6, characterised by the fact that said multipolar ring (5) is axially delimited by a respective lateral surface (14) which is arranged axially staggered in relation to said first external annular positioning surface (9s).

8. Encoder wheel according to claims 6, characterised by the fact that said multipolar ring (5) comprises an annular projection (16r) which is delimited by a connecting surface with the said first external annular positioning surface (9s).

9. Encoder wheel according claim 8, characterised by the fact that said metallic insert (6) comprises a further cylindrical wall (10) which further delimits said housing seat (12), and which presents an external cylindrical surface (10s) which is arranged radially to face opposite said multipolar ring (5).

10. Encoder according preceding claim 8, characterised by the fact that said metallic insert (6) comprises a further cylindrical wall (10) which further delimits the said housing seat (12), and which presents a respective second external annular surface (10s).

11. Encoder wheel according to claim 10, characterised by the fact that said first external annular surface (9s) and said second external annular surface (10s) are axially staggered in relation to each other.

12. Encoder wheel according to claims 6, characterised by the fact that said multipolar ring (5) is axially delimited by a respective lateral surface (14) which is arranged co-planar to the said first external annular positioning surface (9s).

13. Encoder wheel according to claim 12, characterised by the fact that said metallic insert (6) comprises a further cylindrical wall (10) which further delimits said housing seat (12), and which presents a second external annular surface (10s) which is arranged co-planar to the said first external annular surface (9s).

14. Encoder wheel according to claim 1, characterised by the fact that it comprises an annular sealing lip which defines with said annular insert (6) a sealing device (7) which is suitable for preventing the infiltration of external polluting agents into the internal parts of the bearing (2); the encoder wheel being characterised by the fact that said sealing (8) comprises at least one lip (18) which is arranged in sliding contact on one of the axially internal sides of said metallic insert (6), and a further lip (52) which is arranged in sliding contact on a ring (3) of said bearing (2).

* * * * *